United States Patent Office 3,275,038
Patented Sept. 27, 1966

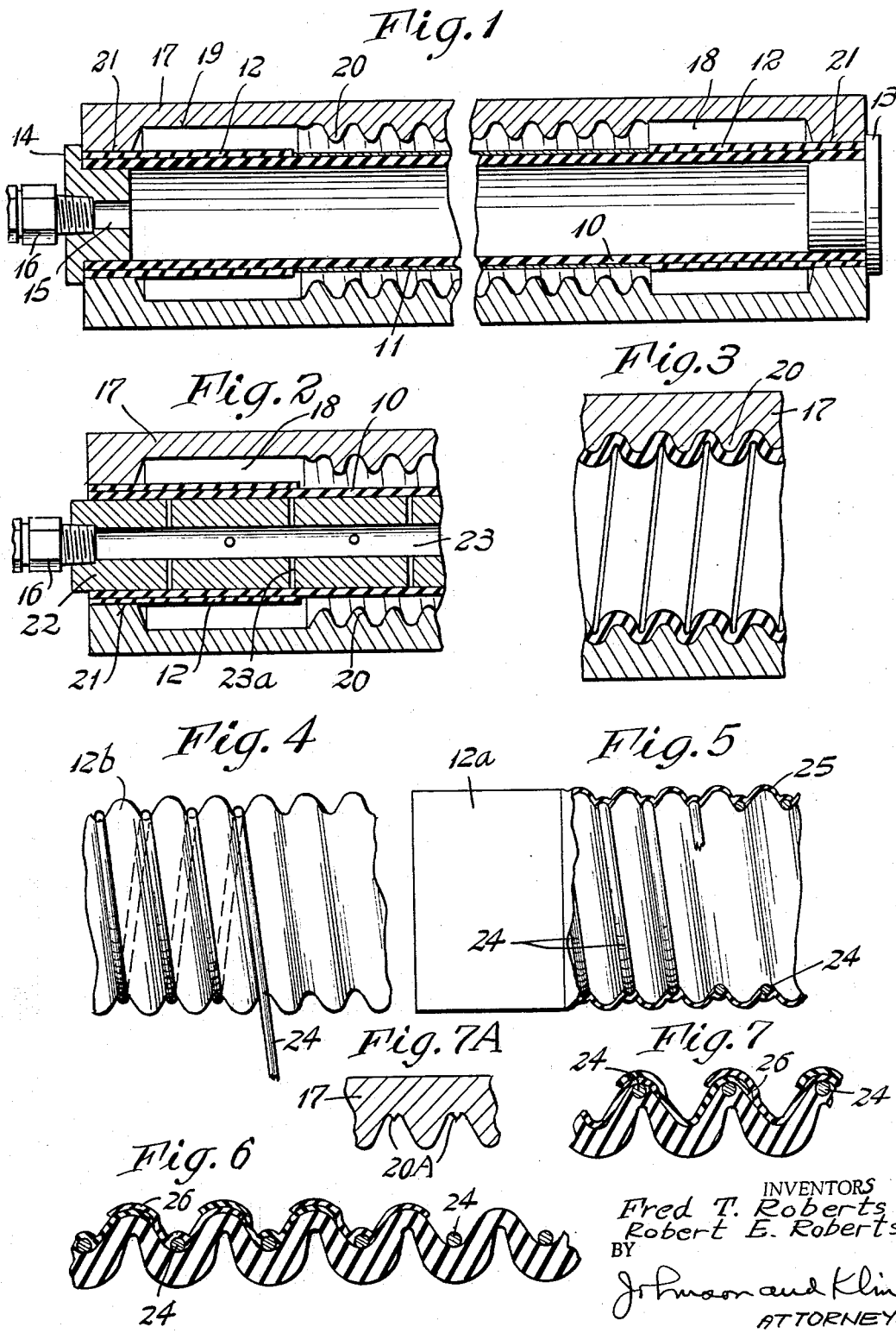

3,275,038
REINFORCED HELICALLY CORRUGATED FLEXIBLE HOSE
Fred T. Roberts and Robert E. Roberts, Wilton, Conn., assignors to Fred T. Roberts & Company, Wilton, Conn., a partnership composed of Fred T. Roberts and Robert E. Roberts
Original application June 26, 1959, Ser. No. 823,085. Divided and this application June 3, 1964, Ser. No. 379,065
3 Claims. (Cl. 138—122)

The present invention relates to a novel helically corrugated reinforced hose and is a species of the invention disclosed and claimed in our copending application Serial No. 664,520, filed June 10, 1957, now Patent No. 2,897,840. In said application a hose body is molded into corrugated shape and a helical spring is disposed over the outer surface thereof so as to lie in the troughs of the corrugations so as to prevent the hose from expanding under abnormally high pressure and a helical spring is disposed within the interior of the hose to lie within the crests of the corrugations to prevent collapse of the hose under abnormally low pressures within the hose.

This application is a division of our application Serial No. 823,085, filed June 26, 1959, now Patent No. 3,157,543.

It is an object of the present invention to provide an improved hose construction which is capable of withstanding abnormally high and/or abnormally low inner pressures.

This is accomplished according to the present invention by forming a hose body of elastomeric material which may or may not be reinforced with a stretchable fabric and to mold the body so as to provide a helically corrugated portion. The molded body is set in its molded form to provide a self-sustaining hose body and a resilient wire is wound on the body so as to lie in the troughs and at least a portion of the convolutions of the wire is secured to the body to hold the wire in position thereon. This will serve to reinforce the hose and hold it against expansion due to abnormal internal pressures while still maintaining the hose in a flexible condition.

If it is desired to provide a hose which is reinforced against expansion or contraction due to abnormal internal pressures, the entire outer surface of the hose can be covered by an elastomeric material with or without fabric reinforcement which is bonded to the body of the hose to hold the wire in position and cause the wire to prevent expansion or contraction of the hose body under abnormal pressures within the hose.

The outer covering may be applied by dipping, spraying or otherwise applying a coating of elastomeric material over the outer surface of the hose and the wire reinforcement or it can be provided by a winding of tape or layer of elastomeric material, with or without fabric reinforcement, over the outer surface of the hose and pressing it into firm relation to the outer surface and bonding it thereto to maintain the wire in position. If it is desired to have a uniform smooth accurate surface on the outer surface of the hose, the hose with the outer layer thereon can be inserted into a corrugated mold cavity and the outer surface molded thereby to produce the desired surface.

Thus, it will be seen that it is unnecessary to preform the helical reinforcements and an economical structure is obtained.

Other features and advantages of the invention will be apparent from the specification and claims when considered in connection with the accompanying drawings in which:

FIGURE 1 shows a longitudinal view of a hose body positioned in a mold cavity prior to the molding thereof.

FIG. 2 is a view, similar to the left of FIG. 1, showing the hose body mounted on a mandrel.

FIG. 3 is a fragmentary view of the mold cavity showing the body molded into a corrugated form.

FIG. 4 shows a fragmentary view of the molded self-sustaining hose with the resilient wire reinforcement being wound thereon.

FIG. 5 shows a view similar to FIG. 4 with an outer layer thereon completely covering the outer surface.

FIG. 6 is an enlarged detailed sectional view of the wall of the hose showing a tape wrapping applied to a portion only of the convolutions of the wound wire.

FIG. 7 is a fragmentary sectional view of the hose with the metal reinforcement wound in the crest of the corrugation.

FIG. 7A is a fragmentary view of the mold showing the groove forming projection.

As shown in FIGS. 1 and 2 of the drawings, the body of the hose comprises an inner layer 10 of elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof). This layer can be formed of an extruded tube or a plurality of wound layers of elastomeric material sufficient to provide the required thickness of the hose wall.

If it is desired to reinforce the body, one or more layers of bias cut elastomeric impregnated fabric or a jacket of stockinette, braid or other stretchable open mesh fabric may be incorporated in at least that part of the body which is adapted to form the corrugated body of the hose. The hose herein illustrated in FIG. 1 has a single layer of elastomeric material 10 disposed under a single jacket or cover 11 of stretchable fabric.

At the end portions and such other portions of the body which are adapted to form the attaching portions of the hose, an extra layer of elastomeric material 12 and/or fabric material impregnated with elastomeric material is provided so as to produce a thickened attaching portion 12a for the hose adapted to be inserted over the usual tubular connectors (not shown).

When relatively short hose sections are formed in separate pieces they can be molded without a mandrel. This is shown in FIG. 1 wherein the ends of the body are provided with plugs 13, 14, the plug 13 being a closing plug while the plug 14 is provided with a bore 15 therein having a nipple 16 which may be connected to a source of fluid under pressure (not shown). The assembled body with the plugs is inserted in a two-part mold 17 having a molding cavity 18 in which cylindrical portions 19 are provided for molding the attaching portions of the hose and the remaining part of the wall of the mold cavity is provided with a helical rib 20 to form a helically corrugated wall therefor. The end portions 21 of the mold grip the body against the plug and effectively seal the same. As shown, the mold cavity is larger than the body so that when fluid pressure is applied to the interior body of the hose through the nipple and plug 14 it will cause the body to expand and the fabric to be stretched substantially to its limit and will cause the body material which is in a moldable condition to be forced through the interstices in the fabric and into engagement with the walls of the cavity, thus providing a molded body having cylindrical attaching portions 12a and a helically corrugated wall 12b having a smooth, uniform, and accurately formed outer surface.

In cases where a relatively long hose is to be formed which may or may not be severed into shorter hose sections, it is preferred to support the body in the mold by a mandrel 22, as shown in FIG. 2, which extends for the full length of the assembled hose body. The end portions 21 of the mold clamp the body against the mandrel and seal the same. The mandrel has a bore 23 adapted to be connected by nipple 16 to a source of fluid pressure. Passages 23a are provided in the mandrel to extend from the bore 23 to the surface of the mandrel whereby the fluid pressure is transmitted to the interior of the body to cause it to be forced outwardly and into molding engagement with the walls of the mold cavity.

If it is desired to use a tube larger than the supporting mandrel and so that the mold cavities may be closed without pinching the tube, vacuum may be applied to the mandrel to draw the tube tightly against the supporting mandrel.

After molding, the hose is then set in its molded form, as shown in FIG. 3, to provide a self-sustaining body. If the elastomeric material is rubber or rubber-like materials, it is vulcanized or cured and if it is a thermoplastic, it is cooled to set the body in its molded shape.

In order to reinforce the hose against expanding under abnormal internal pressures, the present invention provides a reinforcement, preferably formed of continuous, resilient, rust-proofed wire 24, which is wound directly on the accurately formed outer surface of the molded corrugated body so as to be located in the trough and/or crest of the corrugations. As shown in FIG. 4, the wire engages the surface and is accurately positioned in the troughs of the corrugations. When it is desired, the hose can have the wire reinforcement disposed in the crest of the corrugations. As shown in FIG. 7, the hose is molded in a mold 17, as shown in FIG. 7A, having a projection 20A projecting into the cavity to form a groove or the like locating means in the outer surface of the crest of the corrugations into which the wire 24 is wound. This will effectively prevent the hose at these points from expanding outward under abnormally high pressure within the hose. In order to hold the wound wire in position, a cover means can be applied to the outer surface of the body to overlie at least the end portion of the reinforcement. This cover means can be a coating 25 of elastomeric material formed by dipping, spraying or otherwise, as shown in FIG. 5, or can be a wrapping of a tape 26 or other wrapping material overlying the wire, as shown in FIG. 6, which is pressed or rolled into surface engagement with the outer corrugated surface of the hose body. In each case the outer layer is adhered and/or bonded to the hose. The layer may extend over one or more of the convolutions of the wound wire to hold it in place, as shown in FIG. 6, or may extend over the entire corrugated surface, as shown in FIG. 5. In the latter case, the outer layer when bonded to the body and surrounding the wire will tend to hold the hose against collapsing under subnormal pressure within the hose.

If desired to maintain a smooth, accurately formed outer surface on the hose, the hose with the covering layer thereon may be inserted into a mold cavity similar to that shown in FIGS. 1 and 2 and the outer surface molded by internal pressure within the hose pressing the body into engagement with the wall of the mold cavity.

It will be seen from the foregoing that the present invention provides a novel metal reinforced hose wherein the reinforcement is wound on the exterior of a premolded hose having an accurately formed corrugated outer surface so as to lie in the troughs therein and a securing means is applied to the outer surface of the hose and overlying the wound reinforcement to hold it in position so that the wire prevents expansion of the hose under abnormally high pressure and, when the wire reinforcement is completely covered, also prevents collapsing of the hose due to abnormally low pressures within the hose.

Variations and modifications may be made within the scope of the claims and portions of the improvements may be used without others.

We claim:

1. A mold-formed helically corrugated reinforced hose comprising a molded tubular body of moldable elastomeric material having at least one tubular layer of stretchable open mesh fabric therein, said body being set in final molded form and providing a self-sustaining body having helically corrugated walls with the fabric thereof being in stretched condition to conform to the corrugations of the walls and with the elastomeric material extending through the mesh in the fabric and forming a smooth outer surface on the helically corrugated wall, a winding of resilient wire supported upon said smooth surface of said self-sustaining body and disposed in and conforming to the troughs of the helical corrugations, and a cover of elastomeric material extending over at least some of the winding of wire and bonded to the body to hold the wire in position thereon.

2. A mold-formed helically corrugated reinforced hose comprising a molded tubular body of moldable elastomeric material having at least one tubular layer of stretchable open mesh fabric therein, said body being set in final molded form and providing a self-sustaining body having helically corrugated walls with the fabric thereof being in stretched condition to conform to the corrugations of the walls and with the elastomeric material extending through the mesh in the fabric and forming a smooth outer surface on the helically corrugated wall, a winding of rust-proofed resilient wire surrounding the hose and on the smooth surface of the self-sustaining body resting in the troughs of the helical corrugations to resist outward expansion of the hose thereat, and means overlying the winding and bonded to the outer surface of the body for holding the wound wire in position on the body and resist inward deformation of the hose thereat.

3. A mold-formed helically corrugated reinforced hose comprising a molded tubular body of moldable elastomeric material, said body being set in final molded form and providing a self-sustaining body having helically corrugated walls provided with a wire-receiving means in the surface of the crests of the corrugations, a winding of rust-proofed resilient wire surrounding the hose and supported on said surface and resting in the wire-receiving means in the crests of the helical corrugations to resist outward expansion of the hose thereat, and a cover of elastomeric material overlying at least portions of said wound wire and bonded to the outer surface of the body for trapping and holding the wire in position on the body to resist inward deformation of the hose thereat.

References Cited by the Examiner

UNITED STATES PATENTS

| 2,430,081 | 11/1947 | Roberts et al |
| 2,897,840 | 8/1959 | Roberts et al. _____ 138—134 X |
| 2,917,568 | 12/1959 | Moorman et al. _____ 138—122 X |
| 2,967,563 | 1/1961 | Huff et al. _____ 138—138 X |
| 3,037,798 | 6/1962 | Cooper _____ 138—122 X |
| 3,050,087 | 8/1962 | Caplan _____ 138—122 X |

FOREIGN PATENTS

| 157,203 | 6/1954 | Australia. |
| 550,448 | 1/1943 | Great Britain. |

LAVERNE D. GEIGER, *Primary Examiner.*

EDWARD V. BENHAM, LEWIS J. LENNY, *Examiners.*

C. HOUCK, *Assistant Examiner.*

UNITED STATES PATENT OFFICE
CERTIFICATE OF CORRECTION

Patent No. 3,275,038            September 27, 1966

Fred T. Roberts et al.

It is hereby certified that error appears in the above numbered patent requiring correction and that the said Letters Patent should read as corrected below.

Column 1, line 37, for "resilent" read -- resilient --; column 4, line 33, after "and" insert -- resting --; line 34, strike out "resting".

Signed and sealed this 1st day of August 1967.

(SEAL)
Attest:

Edward M. Fletcher, Jr.            EDWARD J. BRENNER

Attesting Officer            Commissioner of Patents